US009532106B1

(12) United States Patent
Gupta et al.

(10) Patent No.: US 9,532,106 B1
(45) Date of Patent: Dec. 27, 2016

(54) VIDEO CHARACTER-BASED CONTENT TARGETING

(71) Applicant: Adobe Systems Incorporated, San Jose, CA (US)

(72) Inventors: Raman Gupta, Bahadurgarh (IN); Neha Saxena, New Delhi (IN); Anuj Jain, Dwarka (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/809,649

(22) Filed: Jul. 27, 2015

(51) Int. Cl.
*H04N 5/445* (2011.01)
*H04N 21/475* (2011.01)
*H04N 21/422* (2011.01)
*H04N 21/258* (2011.01)
*H04N 21/25* (2011.01)
*H04N 21/442* (2011.01)
*H04N 21/466* (2011.01)
*H04N 21/2668* (2011.01)
*H04N 21/81* (2011.01)

(52) U.S. Cl.
CPC ........ *H04N 21/4755* (2013.01); *H04N 21/251* (2013.01); *H04N 21/25883* (2013.01); *H04N 21/25891* (2013.01); *H04N 21/2668* (2013.01); *H04N 21/42203* (2013.01); *H04N 21/44222* (2013.01); *H04N 21/4667* (2013.01); *H04N 21/4668* (2013.01); *H04N 21/812* (2013.01)

(58) Field of Classification Search
CPC ............ H04N 21/23418; H04N 21/254; H04N 21/2542; H04N 21/258; H04N 21/25891; H04N 21/44008; H04N 21/44222; H04N 21/4532; H04N 21/4722; H04N 21/4725; H04N 21/8133
See application file for complete search history.

(56) References Cited

U.S. PATENT DOCUMENTS

| | | | | |
|---|---|---|---|---|
| 7,284,202 | B1 * | 10/2007 | Zenith | G06F 17/30035 348/E7.071 |
| 7,318,104 | B1 * | 1/2008 | Lee | H04N 7/163 375/E7.024 |
| 9,332,228 | B2 * | 5/2016 | Lee | H04N 7/17318 |
| 2003/0106058 | A1 * | 6/2003 | Zimmerman | H04N 7/163 725/46 |
| 2003/0219708 | A1 * | 11/2003 | Janevski | H04N 21/23412 434/350 |
| 2003/0226145 | A1 * | 12/2003 | Marsh | H04N 7/163 725/46 |

(Continued)

*Primary Examiner* — Pankaj Kumar
*Assistant Examiner* — Timothy Newlin
(74) *Attorney, Agent, or Firm* — Wolfe-SBMC (57) ABSTRACT

Video character-based content targeting is described. In one or more embodiments, users make selections of characters in video content in conjunction with playback of the video content. For example, a user is prompted during playback of video content to select a character in the video content that the user likes. An indication is received of selections made by the user of one or more characters, each of which is associated with information that describes a degree to which the character exhibits a plurality of personality attributes. Once received, the user's selections of the one or more characters from the video content are analyzed. In particular, the selections are analyzed to ascertain a degree to which the user identifies with the plurality of personality attributes. The degree to which the user is determined to identify with the plurality of personality attributes is then used to control communication of content to the user.

20 Claims, 7 Drawing Sheets

(56) References Cited

U.S. PATENT DOCUMENTS

| | | | | |
|---|---|---|---|---|
| 2007/0074252 | A1* | 3/2007 | Nazarian | H04N 5/44543 725/46 |
| 2007/0136745 | A1* | 6/2007 | Garbow | G06Q 30/02 725/34 |
| 2008/0196071 | A1* | 8/2008 | Manthoulis | H04N 7/17318 725/100 |
| 2008/0201369 | A1* | 8/2008 | Cordoba | H04N 5/44513 |
| 2009/0132441 | A1* | 5/2009 | Muller | H04N 7/163 706/11 |
| 2010/0122286 | A1* | 5/2010 | Begeja | G06Q 30/02 725/34 |
| 2010/0251298 | A1* | 9/2010 | Brown | H04N 5/44543 725/39 |
| 2012/0151516 | A1* | 6/2012 | Yanko | H04H 60/33 725/24 |
| 2013/0198775 | A1* | 8/2013 | Hyun | H04N 21/435 725/34 |
| 2013/0343720 | A1* | 12/2013 | Abecassis | G11B 27/11 386/239 |
| 2014/0036152 | A1* | 2/2014 | Jackson | H04N 5/44513 348/564 |
| 2015/0086174 | A1* | 3/2015 | Abecassis | H04N 21/4884 386/201 |
| 2016/0037195 | A1* | 2/2016 | Shin | H04N 21/44222 725/14 |
| 2016/0050446 | A1* | 2/2016 | Fujioka | G06F 17/30867 725/93 |
| 2016/0057499 | A1* | 2/2016 | Foerster | H04N 21/4758 705/319 |
| 2016/0094888 | A1* | 3/2016 | Peterson | H04N 21/4821 725/39 |

\* cited by examiner

VIDEO CHARACTER-BASED CONTENT TARGETING

BACKGROUND

Information that describes electronic device users is increasingly tracked. Not only are user demographics, such as the user's age, gender, race, household income, and so on, tracked, but user interactions with content the users consume are also tracked, e.g., selections made or actions taken on a website, selections made to view content, online purchases made, amount of time spent on websites, amount of time spent playing video games, and so on. In some cases, this information can be tracked across multiple devices, resulting in information that describes a substantial portion of a user's activity with electronic devices. Tracking this information enables entities, such as advertisers, to target content to users having certain demographics and who undertake certain activities.

Despite the variety of information available for targeting content to users, efforts to improve such targeting continue, e.g., by changing or adding to the information that is tracked about users and then used to target content to them. For particular types of content, some user interactions are tracked while others are not. Consequently, conventional techniques for targeting content to users are limited by the information tracked.

SUMMARY

Video character-based content targeting is described. In one or more embodiments, users make selections of characters in video content in conjunction with playback of the video content. For example, a user is prompted during playback of video content to select a character in the video content that the user likes. An indication is received of selections made by the user of one or more characters in the video content, each of which is associated with information that describes a degree to which the character exhibits a plurality of personality attributes. Once received, the user's selections of the one or more characters from the video content are analyzed. In particular, the selections are analyzed to ascertain a degree to which the user identifies with the plurality of personality attributes. The degree to which the user is determined to identify with the plurality of personality attributes is determined by combining the degrees to which the characters selected by the user are determined to exhibit the personality attributes. The ascertained degree to which the user identifies with the personality attributes is then used to control communication of content to the user. The communication of content can be controlled such that content items are identified for communication to the user that are targeted to users that identify with the plurality of personality attributes with which the user identifies.

A character selection tool that is part of a media player application is also described. In one or more embodiments, the character selection tool generates prompts for output in conjunction with playback of video content that prompt users to select characters in the video content that they like. Once character selections are received, the character selection tool generates an indication of a user's character selections. In particular, the character selection tool generates the indication for communication to a network service that is configured to control the content communicated to users based on character selections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques for targeting content to users based on user interaction with video content are limited because the user interactions that are tracked are limited. Conventional techniques, for instance, may track a name of video content, a type or genre of the video content, products that appear in the video content viewed, user interactions during playback of video content with controls (e.g., pause, fast-forward, rewind, and so on) of a user interface, and so forth. Despite the variety of information that is tracked by conventional techniques, there remains information associated with video playback that is not tracked for targeting content to users. For example, conventional techniques for tracking information in conjunction with video playback fail to track information that is indicative of attributes a user exhibits in different situations, such as whether the user is responsible, stable, sarcastic, optimistic, needy, impulsive, friendly, naïve, gullible, judgmental, entitled, spoiled, and so on. Such attributes are referred to herein as "personality attributes".

Video character-based content targeting is described. In one or more embodiments, a user selects characters that they like in video content. As used herein a "character" refers to a persona portrayed in video content, e.g., a role played by an actor in a television series or movie, a person appearing in video content such as a home video, an animated being in an animated video, and so on. The selections of the characters from the video content are then used to target content such as advertising and content recommendations to the user. Consider an example in which a user selects that he or she likes a character who is a fashion enthusiast. Based on the user liking the fashion enthusiast character, it is determined that the user is also a fashion enthusiast to at least some degree. As used herein, the term "degree" refers to a numeric value that represents an amount a character exhibits or a user identifies with a personality attribute, and it can be formatted as a score, a percent, a normalized value, a scale, and so on. Further, the degrees associated with characters and users are relative such that the degree to which a character exhibits a given personality attribute can be compared to the degree to which another character exhibits the given personality attribute to indicate which character exhibits the personality attribute more. In a similar manner, the degree to which a user is determined to identify with the given personality attribute can be compared to the degree to which another user is determined to identify with the given personality attribute to indicate which of the users identifies with the given personality attribute more. The degrees associated with characters and the degrees associated with users may not be formatted in the same way. For example, the degree to which a character is determined to exhibit a personality attribute may be formatted as a percentage whereas the degree to which a user is determined to identify with the personality attribute may be formatted as a score indicative of the percentages associated with characters selected by the user as.

Based on the personality attributes with which a user identifies (e.g., according to the determined degree), communication of content to the user can then be controlled. In the example above in which the user is determined to be a fashion enthusiast, communication of content is controlled such that content that is targeted to individuals who to at least some degree are fashion enthusiasts is communicated to the user. It follows too that content targeted to fashion enthusiasts is not communicated to other users who, based on their character selections, are determined not to be fashion enthusiasts.

Generally, different individuals exhibit different personality attributes, such as being responsible, stable, sarcastic, optimistic, needy, impulsive, friendly, naïve, gullible, judgmental, entitled, spoiled, and so on. Different combinations of these and other personality attributes can be exhibited by individuals, in different situations. Additionally, individuals are likely to identify more with people and products that demonstrate personality attributes that are similar to their own personality attributes. For a variety of reasons, simply asking users to specify the personality attributes they exhibit may not be an effective mechanism for determining personality attributes of the users. For example, asking a user to specify his or her personality attributes may disrupt and annoy the user. Additionally, a user may not truly be aware of the personality attributes that he or she exhibits or the user may not be willing to provide correct information about his or her personality attributes. Instead of asking users for their personality attributes directly, the techniques described herein ascertain for users a degree to which they identify with a variety of personality attributes. The degree to which a user identifies with each of the personality attributes is determined by combining the degrees to which the characters selected by the user are determined to exhibit the personality attributes.

Unlike conventional content targeting techniques which target content to users based on user demographics such age, gender, location, past search history, website selections, and so on, the techniques described herein involve targeting content to users based on their personality attributes, which are determined based on the personality attributes of characters selected by the users. By targeting content to users based on their personality attributes, the techniques described herein provide users with content that is tailored to them as a function of their personality more than conventional techniques that target content to users based solely on demographics.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
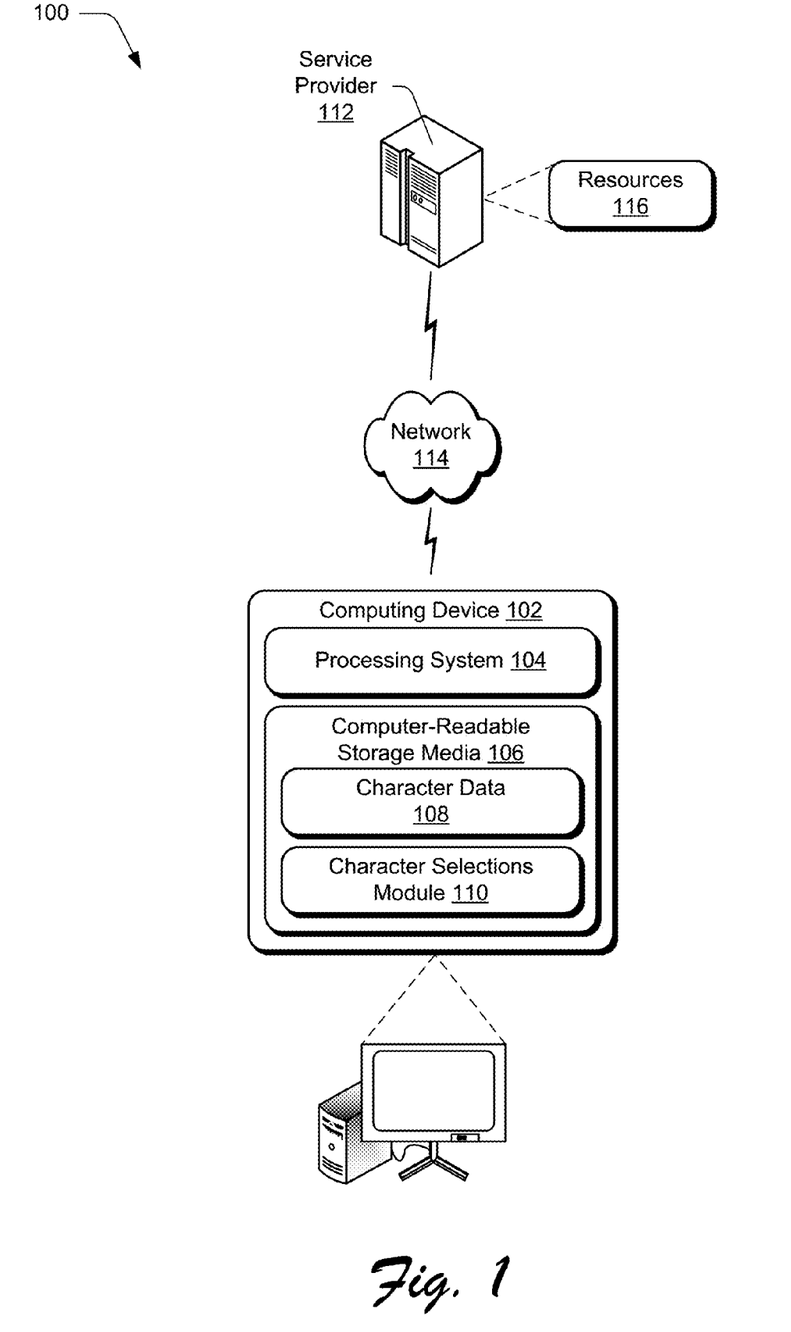
FIG. 1 is an illustration of a digital environment in an example embodiment that is operable to employ techniques described herein.

FIG. 1 is an illustration of an environment 100 in an example embodiment that is operable to employ techniques described herein. The illustrated environment 100 includes a computing device 102 having a processing system 104 that includes one or more processing devices (e.g., processors) and one or more computer-readable storage media 106. The illustrated environment 100 also includes character data 108 and a character selections module 110 embodied on the computer-readable storage media 106 and operable via the processing system 104 to implement corresponding functionality described herein. In at least some embodiments, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 7.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users sign up for accounts that are employed to access corresponding resources from a provider. The provider authenticates credentials of a user (e.g., username and password) before granting access to an account and corresponding resources 116. Other resources 116 are made freely available, (e.g., without authentication or account-based access). The resources 116 can include any suitable combination of services and/or content typically made available over a network by one or more providers. By way of example and not limitation, such services include, but are not limited, to video subscription services (e.g., Hulu®, Netflix®, and so on), video hosting services (e.g., Vimeo®, YouTube®, and so on), cable and satellite television services, and so forth. Providers of services that host or deliver content for consumption by users via a variety of devices, such as cell phones, tablets, televisions, desktop computers and so on are referred to as "content providers".

Content providers serve as sources of significant amounts of video content. The video content that content providers make available for user consumption can include a variety of different types of videos, such as television shows, movies, news, advertisements, home videos, and other video clips. Further, this video content may be formatted in any of a variety of different formats, including but not limited to FLV, MPEG-2, MP4, WMV, MOV, and so on. The video content can also be related to metadata which describes the video content. For example, metadata can describe properties of the video content such as a title, a date the content was aired, where breaks occur in the content, a director of the content, actors included in the content, and so on.

In addition, metadata that is related to video content can describe characters in the video content. By way of example, the metadata for a television show can describe personality attributes of a character in the television show, such as whether the character is a fashion enthusiast, romantic, career-focused, intelligent, a foodie, has a sarcastic sense of humor, innocent, and so on. Character data 108 represents such video content metadata, which may be expressed in any of a variety of syntaxes, including but not limited to plain text, HTML, XML, RDF, and so on. The character data 108 may be maintained in conjunction with the video content to which it corresponds. It may also be maintained and accessed separately from the video content to which it corresponds. To this extent, information about the video content can be communicated over the network 114 without also having to communicate the corresponding video files.

The character selections module 110 represents functionality to implement techniques for video character-based content targeting as described herein. As part of doing so, the character selections module 110 receives indications of selections made by users of characters in video content. The selections can indicate the characters in the video content that a user likes. Using the character data 108 for a particular video, the character selections module 110 associates the characters in the particular video with a degree to which they exhibit a plurality of different personality attributes. For example, given the personality attributes of fashion enthusiast, romantic, career-focused, intelligent, a foodie, has a sarcastic sense of humor, innocent, the character selections module 110 determines the degree to which each character in the particular video exhibits each of these personality attributes.

A user's selections are analyzed based on the degree to which the characters he or she selected exhibit the different personality attributes. If the user selects a character that exhibits the personality attribute of being a fashion enthusiast, the character selections module 110 determines that the user is a fashion enthusiast to some degree. The degree to which the user is identified as a fashion enthusiast is based on the selections made. The character selections module 110 considers each of the character selections made by the user to associate with the user the degree to which the user identifies with the different personality attributes.

The character selections module 110 also represents functionality to target content to the user based on the degree to which the user identifies with the different personality attributes. If the user identifies with a given personality attribute, the character selections module 110 can communicate content to the user that is intended for individuals that identify with the given personality attribute. Continuing with the example in which the user identifies at least to a degree as a fashion enthusiast, the character selections module 110 can control content communicated to the user based on this identification. Advertising content, for instance, may be designated for communication to users who identify to at least some degree as fashion enthusiasts. The character selections module 110 may thus allow communication of such advertising content to the user of this example because he or she is determined to identify with fashion enthusiasts.

In one or more embodiments, the character selections module 110 is implementable as a software module, a hardware device, or using a combination of software, hardware, firmware, fixed logic circuitry, etc. Further, the character selections module 110 can be implementable as a standalone component of the computing device 102 as illustrated. In addition or alternatively, the character selections module 110 can be configured as a component of a web service, an application, an operating system of the computing device 102, a plug-in module, or other device application as further described in relation to FIG. 7.

Having considered an example environment, consider now a discussion of some example details of the techniques for video character-based content targeting in accordance with one or more embodiments.

Video Character-Based Content Targeting

Figure 2:
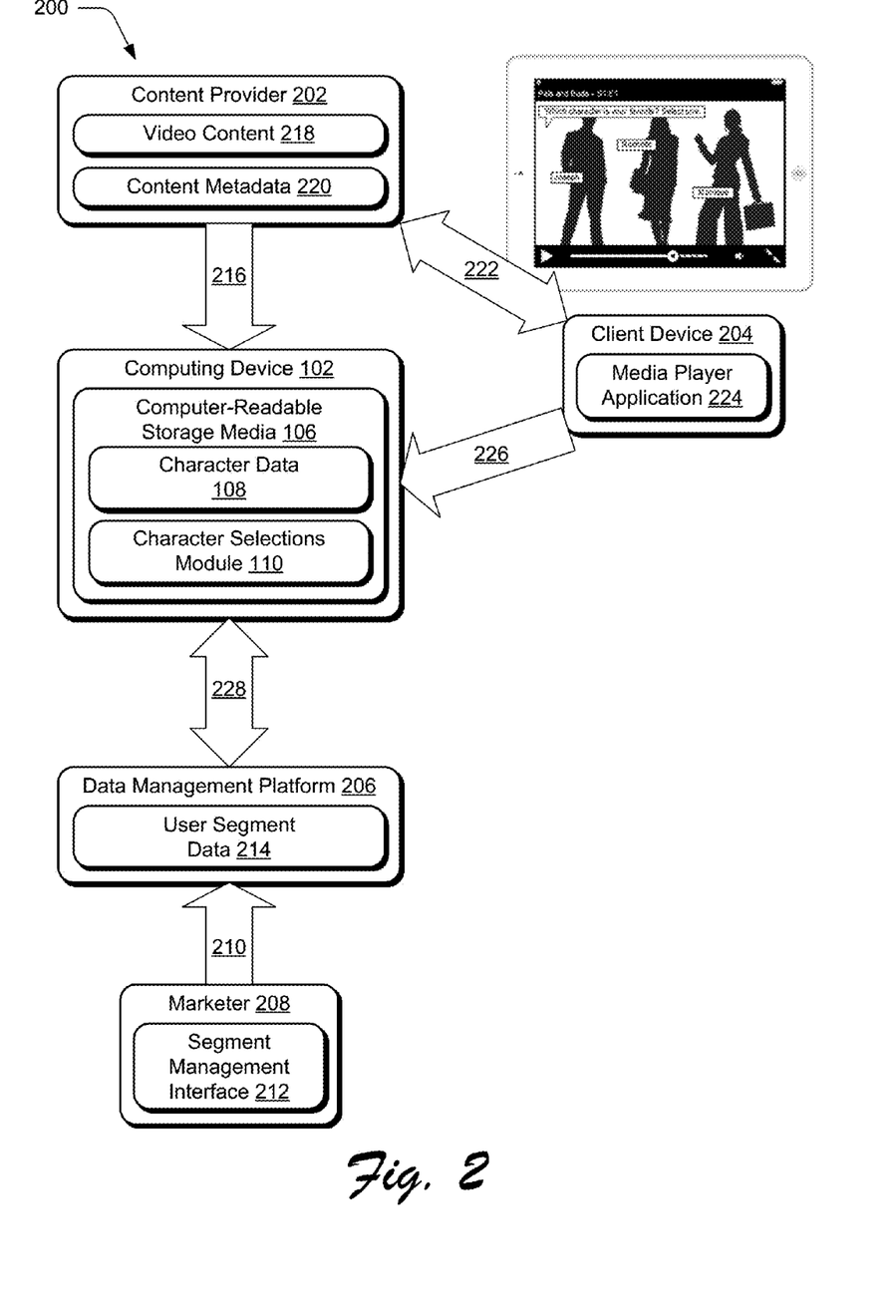
FIG. 2 illustrates portions of the environment from FIG. 1 and interactions with various entities to enable control of targeted communication based on selections of characters in video content.

This section describes some example details of techniques for video character-based content targeting in accordance with one or more embodiments. FIG. 2 depicts generally at 200 some portions of the environment 100 of FIG. 1, and how those portions interact with various entities to enable control of targeted communications based on selection of characters in video content. In particular, the computing device 102 is depicted in interactions involving a content provider 202, a client device 204, a data management platform 206, and a marketer 208.

In one or more embodiments, the marketer 208 interacts with the data management platform 206 to create segments of users. This interaction is represented by arrow 210. By way of example, the marketer 208 may create segments of users for different use cases like content recommendation, delivery of personalized advertising, and so on. The marketer 208 is depicted having segment management interface 212, which is representative of a user interface displayed to the marketer 208 via a computing device and allows the marketer 208 to create user segments.

The segment management interface 212 allows entities, such as the marketer 208, to specify different segments of users for targeting communications. By way of example, the segment management interface 212 allows the marketer 208 to specify the following segments into which users can be grouped: young-trendy, young-sports enthusiast, rich tennis loving male, young athlete, and so on. It is to be appreciated that this list of segments is just one example of user segments that can be specified using the segment management interface 212. The segment management interface 212 enables different segments to be specified without departing from the spirit or scope of the techniques describe herein. For instance, more or fewer segments can be created by an entity using the segment management interface 212. An entity may also create entirely different segments than those listed above.

The data management platform 206 is illustrated with user segment data 214. The user segment data 214 represents data indicative of the user segments that are created through the segment management interface 212. The user segment data 214 may be formatted in a variety of different ways to implement created user segments. For example, the user segment data 214 may include for each segment a name of the segment, e.g., "rich tennis loving male", and keywords that describe the segment, e.g., rich, sports, loving, tennis shoes, tennis ball, racquet, Head®, Wilson®, and so on. The user segment data 214 may include additional or different information about user segments without departing from the spirit or scope of the techniques described herein.

The information included in the user segment data 214 may correspond to a configuration of the segment management interface 212. In the case in which the user segment data 214 includes just a name and keywords that describe user segments, the segment management interface 212 is configured with user interface elements that allow the marketer 208 to specify a name and keywords for a user segment. The user interface elements may comprise fields that allow the marketer 208 to type information into the segment management interface 212, select options from menus, dropdowns, and so on. The segment management interface 212 may also allow an entity to define user segments in other ways, such as by specifying values in a spread sheet and then uploading the spreadsheet through the segment management interface 212. Regardless of the particular user interface elements of the segment management interface 212, it is configurable to include elements that correspond to the information used to define the user segments.

FIG. 2 also depicts interaction between the content provider 202 and the computing device 102, which is indicated by arrow 216. The interaction indicated by the arrow 216 involves communication of information about video content from the content provider 202 to the computing device 102. In the illustrated example 200, the content provider 202 is depicted having video content 218 and content metadata 220. Generally, the content metadata 220 describes the video content 218. For example, the content metadata 220 is configured to describe a title of the video content 218, its genre, provide credit information, and so on. With regard to the techniques described herein, the content metadata 220 can also be configured to describe characters in the video content 218. By way of example, the content metadata 220 can describe which characters in the video content 218 are part of a particular scene of the video content 218, describe the actions the characters are taking in the particular scene, describe what the characters are saying, and so on.

In addition, the content metadata 220 can describe personality attributes of the characters in a particular video, such as in a movie or a particular episode of a television show. In one or more embodiments, the content provider 202 defines personality attributes that are exhibitable by characters in a video or in a series of videos, e.g., a television series. For example, the content provider 202 specifies that the characters of a given video or series of videos can exhibit the personality attributes of being a fashion enthusiast, a romantic, career-focused, intelligent, a foodie, having a sarcastic sense of humor, and innocent. The content provider 202 can specify that the character of a different video or series of videos can exhibit a different set of personality attributes. Regardless of the personality attributes defined, the content provider 202 can communicate this information to the computing device 102 as part of the content metadata 220.

Definition of the personality attributes that are exhibitable by characters in a video or series of videos may also be performed by the character selections module 110. To do so, the character selections module 110 is configured to analyze the content metadata 220 that is communicated thereto as per the arrow 216. In particular, the character selections module 110 can analyze the content metadata 220 that describes the characters in the video content 218 to condense their behaviors (e.g., actions and words) and attributes already provided by the communicated metadata into a set of personality attributes.

Given the defined personality attributes, the character selections module 110 analyzes the content metadata 220 describing the characters to determine personality attributes exhibited by the characters. In the continuing example in which personality attributes for a video or series of videos include fashion enthusiast, romantic, career-focused, intelligent, a foodie, has a sarcastic sense of humor, and innocent, the character selections module 110 determines whether and to what degree characters of the video or video series exhibit these attributes. To do so, the character selections module 110 can analyze the actions taken in the video content 218 (and described by the content metadata 220) that are indicative of the different attributes. For example, when the content metadata 220 indicates that a character goes shopping for clothes in a video, the character selections module 110 can determine that the character exhibits the personality attribute of being a fashion enthusiast. In a similar manner, when the content metadata 220 indicates that two characters write love notes to each other, the character selections module 110 can determine that the two characters exhibit the personality attribute of being romantic.

In addition to determining that characters exhibit the personality attributes, the character selections module 110 is configured to determine a degree to which the characters exhibit the personality attributes. To do so, the character selections module 110 processes the content metadata 220, such as to ascertain actions the characters take and words they speak. The character selections module 110 can then classify the actions and words as being indicative of one or more of the personality attributes. Based on the analysis of the content metadata 220 the character selections module 110 associates a character with a degree to which it exhibits the different personality attributes. By way of example, the character selections module 110 can associate percentages with the character for each of the personality attributes that indicate the degree to which the character exhibits those personality attributes during a video, e.g., an episode of a television show. In a video, for instance, a character may exhibit a dominant personality attribute. Thus the dominant personality attribute is associated with a greater degree than less dominant personality attributes exhibited by the character.

Consider an example in which a character named Rochelle in a first episode of a first season of a show called Pals and Buds is determined to be 70% a fashion enthusiast, 10% a romantic, and 20% career-focused. These percentages can be associated with the Rochelle character by the character selections module 110 based on its analysis of the content metadata 220 for the first episode of the first season of Pals and Buds. Based on an analysis of the content metadata 220 for other episodes, however, the character selections module 110 can associate different percentages with Rochelle for the different personality attributes. In other words, the character selections module 110 is capable of determining the degree to which characters exhibit each of the personality attributes on a per-video basis.

Having determined the degrees to which characters in the video content 218 exhibit the plurality of personality attributes, the degree to which users identify with the personality attributes exhibited by the characters can also be determined. To do so, the techniques described herein ascertain the characters in the video content 218 with which users identify.

A user of the client device 204 requests a video from the content provider 202, which is represented by arrow 222. For example, the user selects a link (e.g., a uniform resource locator (URL)) that corresponds to the video, selects an option displayed as part of an electronic programming guide (EPG) to watch the video, changes to a channel to watch the video, and so on. The arrow 222 also represents a response of the content provider 202 to the request. For example, the content provider 202 communicates the video content 218 and the content metadata 220 corresponding to the video to the client device 204 for playback. The content metadata 220 communicated to the client device 204 can include the content metadata describing the characters in the requested video content 218, including any personality attributes defined by the content provider 202 in association with the requested video content. The content provider 202 may stream the video to the client device 204, communicate data representing an entirety of the video to the client device 204, and so on. In any case, the data communicated from the content provider 202 to the client device 204 enables playback of the video at the client device 204.

Media player application 224 represents functionality of the client device 204 to playback the video content 218. The media player application 224 is configured to cause videos to be displayed via a display device of the client device 204. The media player application 224 is also configured to enable a user of the client device 204 to interact with videos being played back. For example, the media player application 224 enables a user to control video playback, such as by selecting to play videos, stop them, pause them, rewind them, fast-forward them, play them in slow motion, and so on. The media player application 224 enables a user to perform these control operations via a user interface.

Figure 3:
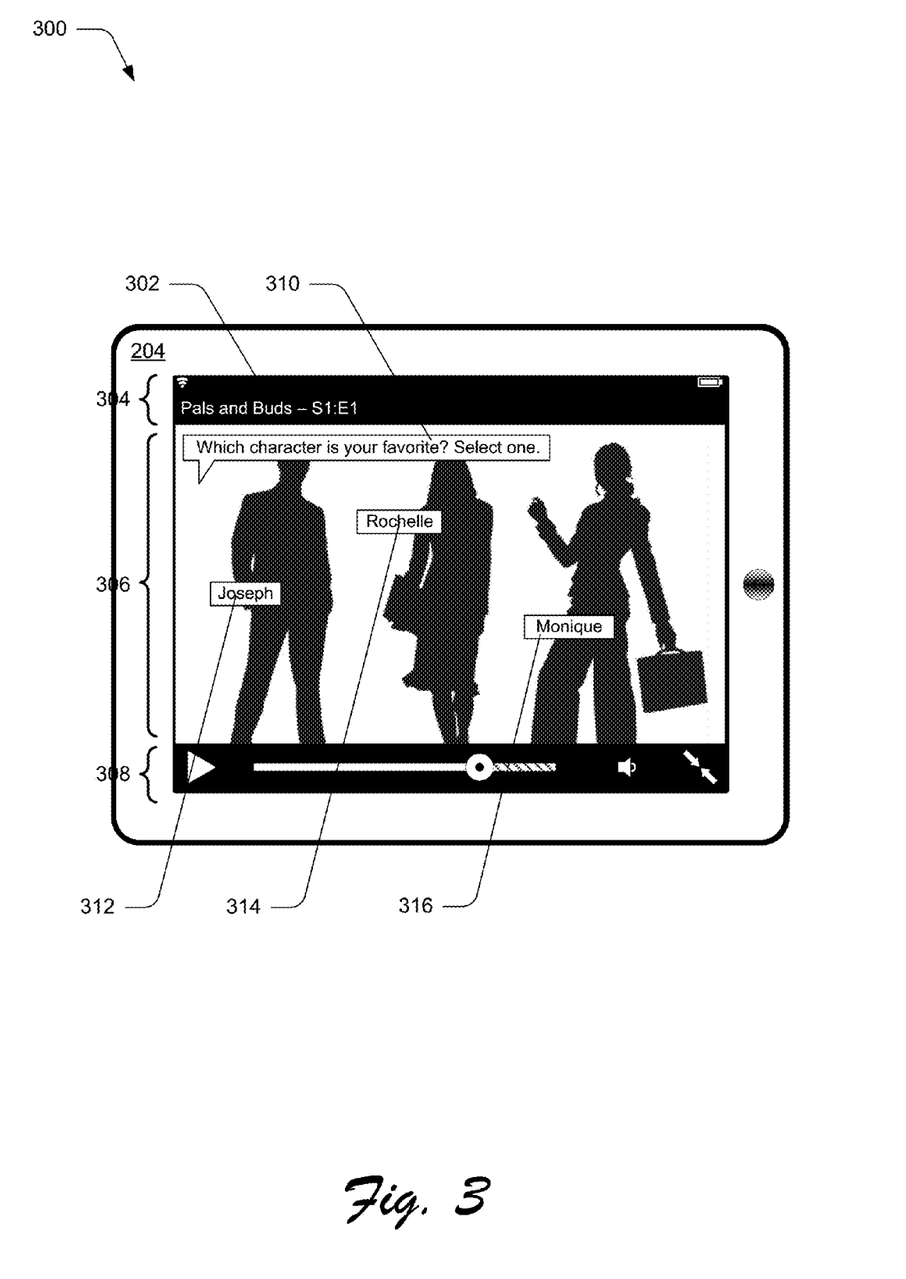
FIG. 3 is an example embodiment depicting a user interface for video character-based content targeting.

FIG. 3 depicts an example at 300 of a user interface for video character-based content targeting. In the example at 300, the client device 204 of FIG. 2 is depicted playing back an episode of a show "Pals and Buds" via user interface 302. The user interface 302 is displayed via a display device of the client device 204. In the illustrated example, the user interface 302 includes an information portion 304, a video playback portion 306, and a control portion 308. The information portion 304 provides information about the video being played back. In the illustrated example, the information portion 304 indicates the title of the video being played back and that the video corresponds to a first episode of a first season of the show. The control portion 308 includes user interface elements that allow a user to control playback of the video, e.g., a play button, a slider bar, and so on.

The video playback portion 306 of the user interface 302 is configured to display the video being played back. In one or more embodiments, the video playback portion 306 can be expanded to cover an entirety of the display. In other words, the information portion 304 and the control portion 308 of the user interface 302 can be hidden during playback. In the illustrated example, the video playback portion 306 also includes prompt 310, and selection indications 312, 314, 316. In this case, the prompt 310 prompts the user to select a favorite character in the video. Other prompts may be output, however, such as to select a character that the user likes, a character that the user wants to emulate, and so on.

The selection indications 312, 314, 316 of the illustrated example, which correspond to "Joseph", "Rochelle", and "Monique" respectively, indicate characters that are selectable as the user's favorite character from the video. Although the example in FIG. 3 depicts the prompt 310 and the selection indications 312, 314, 316 overlaying the video being played back, the user interface 302 may be configured to display these without obstructing the video. By way of example, the user interface 302 may be configured with a smaller video playback portion 306, and also to include a character selection portion in which one or more of the prompt 310 and the selection indications 312, 314, 316 can be displayed. Additionally or alternately, the prompts can be output during breaks of the videos (e.g., during commercial breaks) or when the program has ended (e.g., during or after closing credits) so as not to obstruct the video or interfere with its playback.

The media player application 224 also represents functionality to generate such prompts and selection indications for display via the user interface 302. A character selection tool of the media player application 224 may be configured to cause users to be prompted to select characters in other ways with departing from the spirit or scope of the techniques described herein. By way of example and not limitation the character selection tool of the media player application 224 may be configured to generate prompts for output via speakers of the client device 204, such that the speakers output an audio prompt like "Who is your favorite character in the first episode in the first season of Pals and Buds? Joseph, Rochelle, or Monique?"

Accordingly, a user may select characters in conjunction with video playback. When the display device of the client device 204 is configured with touch functionality, the user may select a character using the touch functionality, e.g., the user may touch the display device at a location proximate one of the selection indications 312, 314, 316. In the example in which the prompt is output via speakers of the client device 204, a user may select a character by speaking a selection and microphones of the client device 204 are used to capture the user's spoken selection. To select Rochelle, for example, the user can simply say "Rochelle". A user may be prompted to select characters and respond to the prompts to select characters in a variety of other ways without departing from the spirit or the scope of the techniques describe herein.

Regardless of how a user selects characters, the character selection tool of the media player application 224 is configured to generate an indication of the user's selections for communication to the computing device 102. The indication generated indicates at least information that is usable to identify the user, characters selected by the user, and the video relative to which the character was selected. With regard to the example of FIG. 3, if a user responsive to the prompt 310 selects the selection indication 314, the character selection tool of the media player application 224 generates an indication that indicates identifying information of the user, that the user selected Rochelle as his or her favorite character, and that the selection was made relative to episode one of season one of the show Pals and Buds. In a case where a similar prompt is output in conjunction with playback of episode two of season one of Pals and Buds and the user selects Joseph as his or her favorite character, the indication can indicate the user's identifying information, the selections of both Rochelle (in association with episode one, season one) and Joseph (in association with episode two, season one). Thus, the character selection tool of the media player application 224 is configured to generate indications for communication to the computing device 102 that cover a user's character selections for multiple different videos.

Communication of the character-selection indications to the computing device 102 is represented by arrow 226. By analyzing the selections made by a user of characters in the video content 218, the character selections module 110 can associate the user with a degree to which the user identifies with the personality attributes. In other words, the character selections module 110 infers a user's personality attributes based on the personality attributes exhibited by the characters the user selects. A large number of character selections made by a user over a variety of different videos, can result in robust data regarding the characters (and thus personality attributes) with which a user identifies.

To associate users with degrees to which they identify with the different personality attributes, the character selections module 110 may aggregate the personality attributes exhibited by the selected characters. With reference to the example in which a user selects Rochelle in conjunction with season one, episode one of the show "Pals and Buds" and Joseph in conjunction with season one, episode two of the show, assume that Rochelle in season one, episode one exhibits the above-enumerated personality attributes to the following degree: fashion enthusiast—70%, a romantic—10%, career-focused—20%, intelligent—0%, a foodie—0%, having a sarcastic sense of humor—0%, and innocent—0%. Assume also that Joseph exhibits those personality attributes as follows: fashion enthusiast—0%, a romantic—5%, career-focused—0%, intelligent—0%, a foodie—65%, having a sarcastic sense of humor—0%, and innocent—30%.

To aggregate the personality attributes for a user, the character selections module 110 can, for each personality attribute, add the degree it is exhibited by each of the selected characters and divide by the number of selections made. To compute the degree to which the user identifies with being a fashion enthusiast given the selections of Rochelle and Joseph, for example, the character selections module 110 adds the degree to which Rochelle exhibits being a fashion enthusiast (70%) with the degree to which Joseph exhibits being a fashion enthusiast (0%) and divides by two (the number of selections made in the example), the result of which is an aggregated degree for the user of 35%. In a similar manner, the degree to which the user identifies with being a romantic is computed as follows: add Rochelle's 10% and Joseph's 5%, and divide the total (15%) by two, the result of which is a degree of 7.5% for the user.

This aggregation technique is just one way by which the degree to which the user identifies with the plurality of personality attributes may be determined. The degree to which the user identifies with the plurality of personality attributes may be determined in a variety of other ways without departing from the spirit or scope of the techniques described herein. By way of example and not limitation, selections made by a user may be tracked over multiple viewing sessions, and the analysis of the selections can including weighting the selections such that the selections made in conjunction with more recent video-viewing sessions have more weight in determining the degree to which the user identifies with the plurality of personality attributes than selections made in conjunction with less recent video-viewing sessions.

Given the degree to which a user identifies with the personality attributes, the character selections module 110 applies a semantic similarity algorithm to associate the user with the user segments defined by the marketer 208. The character selections module 110 does so through interaction with the data management platform 206. This interaction is represented by the arrow 228. The semantic similarity algorithm maps users based on their inferred personality attributes to the different user segments created, e.g., the user segments created during the interaction represented by the arrow 210.

Broadly speaking the character selections module 110 applies the semantic similarity algorithm to determine a probability that a user falls into a certain user segment. The character selections module 110 makes the determination based on an amount of co-occurrence of the words corresponding to a personality attribute to the keywords used to describe a user segment. To make this determination, the character selections module 110 considers the co-occurrence of the personality attribute and user segment keywords on the web. The character selections module 110 causes a search to be performed on the web for the personality attribute words, the result of which is the number of occurrences of the personality attribute words on the web. The number of occurrences of the personality attribute words is represented herein by the term $N_a$. The character selections module 110 also causes a search to be performed on the web for the keywords describing the user segment, the result of which is the number of occurrences of those keywords on the web. The number of occurrences of the user segment keywords is represented herein by the term $N_b$. Additionally, the character selections module 110 causes a search to be performed on the web for content in which the personality attribute words and the user segment keywords appear together. The number of occurrences of the personality attribute words and the user segment words appearing in content together is represented by the term $N_{(a+b)}$. The similarity between the two words can be determined according to the following:

$$\frac{(N_{(a+b)} - \min(N_a, N_b))}{\max(N_a, N_b)}$$

The character selections module 110 can also determine the similarity between the personality attribute words and the user segment words in other ways without departing from the spirit or scope of the techniques described herein. For example, the character selections module 110 can determine such similarity using distance function SD (a, b) as follows:

$$SD(a, b) = \frac{\max(\log N_a, \log N_b) - \log N_{(a+b)}}{\log P - \min(\log N_a, \log N_b)}$$

Here, P is the number of pages of content that were searched for the personality attribute words and the user segment words. A probability that a user U falls into a given user segment M is expressed as a semantic distance between a user and a user segment. The character selections module 110 determines this semantic distance according to the following:

$$Dist(U, M) = \left( \sum_i \sum_j \frac{SD(A_i, B_j)}{\log(0.5(rel(A_i) + rel(B_j)))} \right) / N$$

In this expression, rel ($A_i$) represents a relevance of the personality attribute words $A_i$ for the user U, rel($B_j$) represents a relevance of the user segment keywords $B_j$ for the user segment M, and N is the total number of user segments and personality attributes considered for classifying the user U into the user segment M. In one or more examples, the relevance of a personality attribute corresponds to the degree to which the character identifies with that attribute, e.g., which is determinable according to the aggregation technique discussed in detail above.

The computed semantic distance, which is represented by Dist(U, M), is a value between zero and one. Lesser values (e.g., those closer to zero) of the semantic distance indicate a better match of the user with the user segment than greater values. In one or more embodiments, a threshold is used to determine whether a user and a user segment are to be associated. If the semantic distance for a user and a user segment is less than the threshold, then the user is associated with the user segment. However, if the semantic distance for the user and the user segment is greater than the threshold, then the user is not associated with the user segment.

Based on the user segments with which the user is associated, the character selections module 110 can control content that is communicated to the user. For example, if content is received that is to be communicated to users who are young-trendy, the character selections module 110 can ascertain which users are associated with the young-trendy user segment. The content for the young-trendy segment can then be communicated to users who have been associated with the young-trendy user segment based on a similarity determination between young-trendy and the plurality of personality attributes. Furthermore, the content for the young-trendy segment can be withheld from users who have not been associated with the young-trendy user segment. In this way, users who are more likely to identify with young-trendy based content are delivered that content whereas it is not delivered to users who are not likely to identify with that content. The character selections module 110 can control communication of a variety of types of content in this manner, such as advertisements, content recommendations, and so on.

In one or more embodiments, the techniques described herein are applied to users that opt into a feature for controlling targeted content based on character selection. In this way, the prompting of a user to select characters in conjunction with playback of videos may be limited to the users that have opted into the feature. Users that have not opted into the feature may not be prompted to select characters in conjunction with video playback. Furthermore, by opting into the feature not only is a user prompted to make selections but the selections can be used along with demographic data about the user to control communication of targeted content to the user. When users do not opt into this feature, information about their personality attributes cannot be inferred from character selections, and thus used to control content communication to those users.

Having discussed example details of the techniques for video character-based content targeting, consider now some example procedures to illustrate additional aspects of the techniques.

Example Procedures

This section describes example procedures for video character-based content targeting in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures are performed by a suitably configured device, such as the example computing device 102 of FIG. 1 that makes use of a character selections module 110, or the client device 204 that makes use of a media player application 224 and components thereof.

Figure 4:
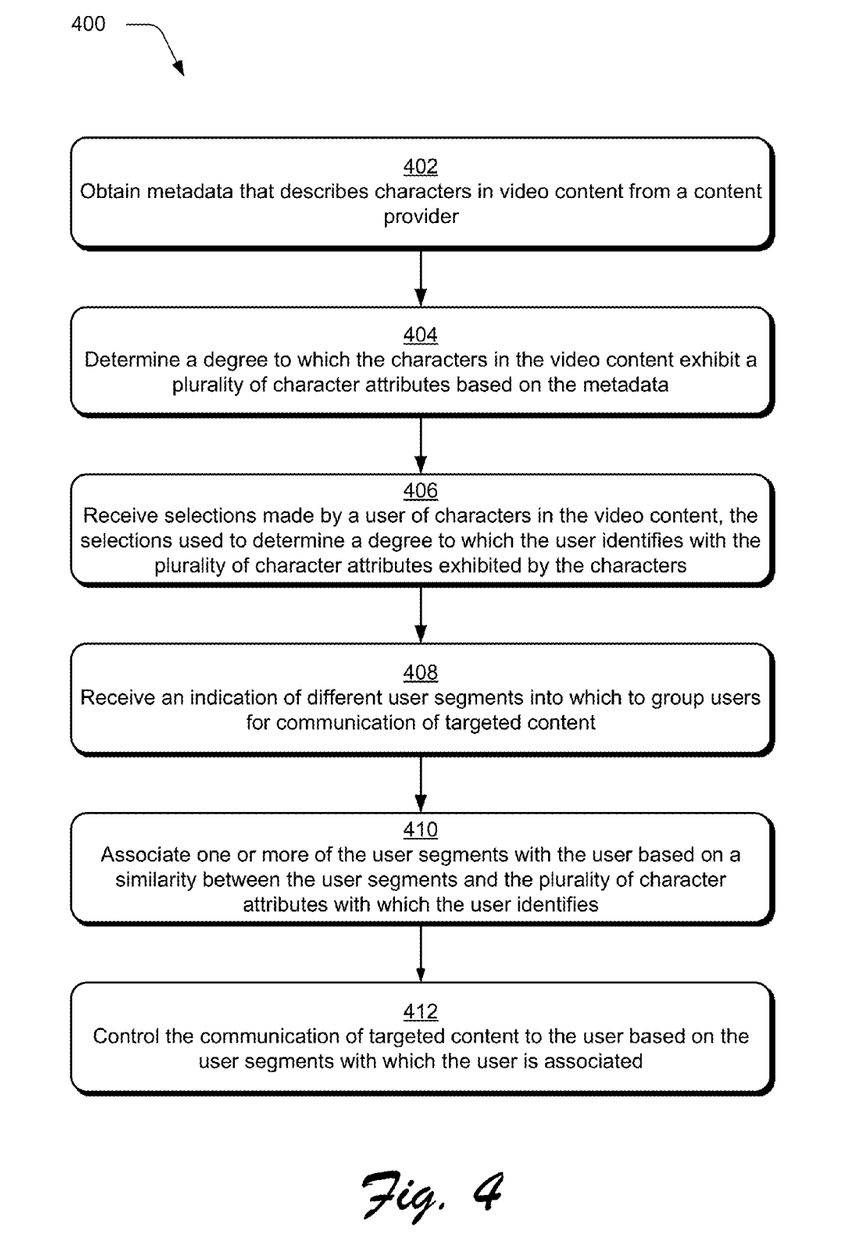
FIG. 4 is a flow diagram depicting a procedure in an example embodiment in which communication of content to a user is controlled based on selections made by the user of characters in video content.

FIG. 4 depicts an example procedure 400 in which communication of content to a user is controlled based on selections made by the user of characters in video content. Metadata is obtained from a content provider that describes characters in video content (block 402). For example, the character selections module 110 obtains the content metadata 220 that describes characters in the video content 218. In one or more embodiments, the content provider 202 defines a plurality personality attributes for a video or series of videos (e.g., a television series) and communicates the defined personality attributes along with the content metadata 220.

A degree to which the characters in the video content exhibit a plurality of personality attributes is determined (block 404). For example, the character selections module 110 analyzes the metadata obtained at block 402 to determine character attribute values that are indicative of a degree to which the characters exhibit defined personality attributes. As discussed above, the personality attributes relative to which the degree of exhibition is determined can be communicated to the computing device 102 with the content metadata 220. Alternately or in addition, the character selections module 110 analyzes the content metadata 220 communicated and defines the plurality of personality attributes. Regardless of the entity that defines the personality attributes, the character selections module 110 determines a degree to which the characters in the video content 218 exhibit the plurality personality attributes. The character selections module 110 does so by analyzing the content metadata 220 obtained from the content provider 202. The analysis performed by the character selections module 110 may involve determining that actions performed or words spoken by a character, per the communicated content metadata, are indicative of a given personality attribute.

Selections made by a user of characters in the video content are received (block 406). These selections are used to determine user attribute values that are indicative of a degree to which the user identifies with the plurality of personality attributes exhibited by the characters. For example, the character selections module 110 receives selections made by a user of the client device 204 of characters in the video content 218. The character selections module 110 uses these selections to determine a degree to which the user identifies with the plurality of personality attributes. By way of example, the character selections module 110 applies the aggregation technique discussed above to the character selections made by the user to aggregate the degrees to which the selected characters exhibit the plurality of personality attributes into a degree to which the user identifies with the plurality of personality attributes. The user attribute values, which indicate the degree to which the user identifies with the personality attributes, are maintained as part of an account that corresponds to this user. In this way, the user attribute values can be accessed via the account to identify content items that are to be communicated to the user, such as content items that are targeted to users that identify with different personality attributes to the degree to which the user identifies with the different personality attributes.

An indication is received of different user segments into which to group users for communication of targeted content (block 408). For example, the character selections module 110 receives from the marketer 208, by way of the data management platform 206, user segments into which users are to be grouped for communication of targeted content. These user segments can correspond to different marketing segments that the marketer 208 wishes to target for advertising content or content recommendations, for example.

One or more of the different user segments are associated with the user based on a determined similarity between the user segments and the plurality of personality attributes with which the user identifies (block 410). For example, the character selections module 110 determines a similarity between the personality attributes with which a user identifies, according to the user attribute values, and the user segments. To do so, the character selections module 110 applies a semantic similarity algorithm to determine a similarity between words used to define the personality attributes and keywords that describe the user segments, as described in more detail above. The result is an indication of similarity between the personality attributes and the user segments. The character selections module 110 associates the user with user segments that are similar to the personality attributes with which the user identifies, e.g., similar based on comparison to a threshold.

Communication of targeted content to the user is controlled based on the user segments with which the user is associated (block 412). For example, the character selections module 110 identifies content items that are targeted to a user based on the user segments associated with the user at block 410. In one or more embodiments, users also have corresponding demographic data, such as age, gender, location, race, sexual orientation, and so on. The communication of targeted content can thus be controlled based on both a user's demographic data and the personality attributes with which the user identifies (according to on the user's character selections). To this extent, users having similar demographic data can be further distinguished for the purposes of targeting content as a function of the characters they choose in conjunction with video playback. The content can be communicated to the user via an account corresponding to the user, such as an email account. The content can also be communicated, for instance, via a website for which a user has signed into a profile. The content can be communicated to the user via a corresponding account of the user in a variety of ways without departing from the scope of the techniques described herein.

Figure 5:
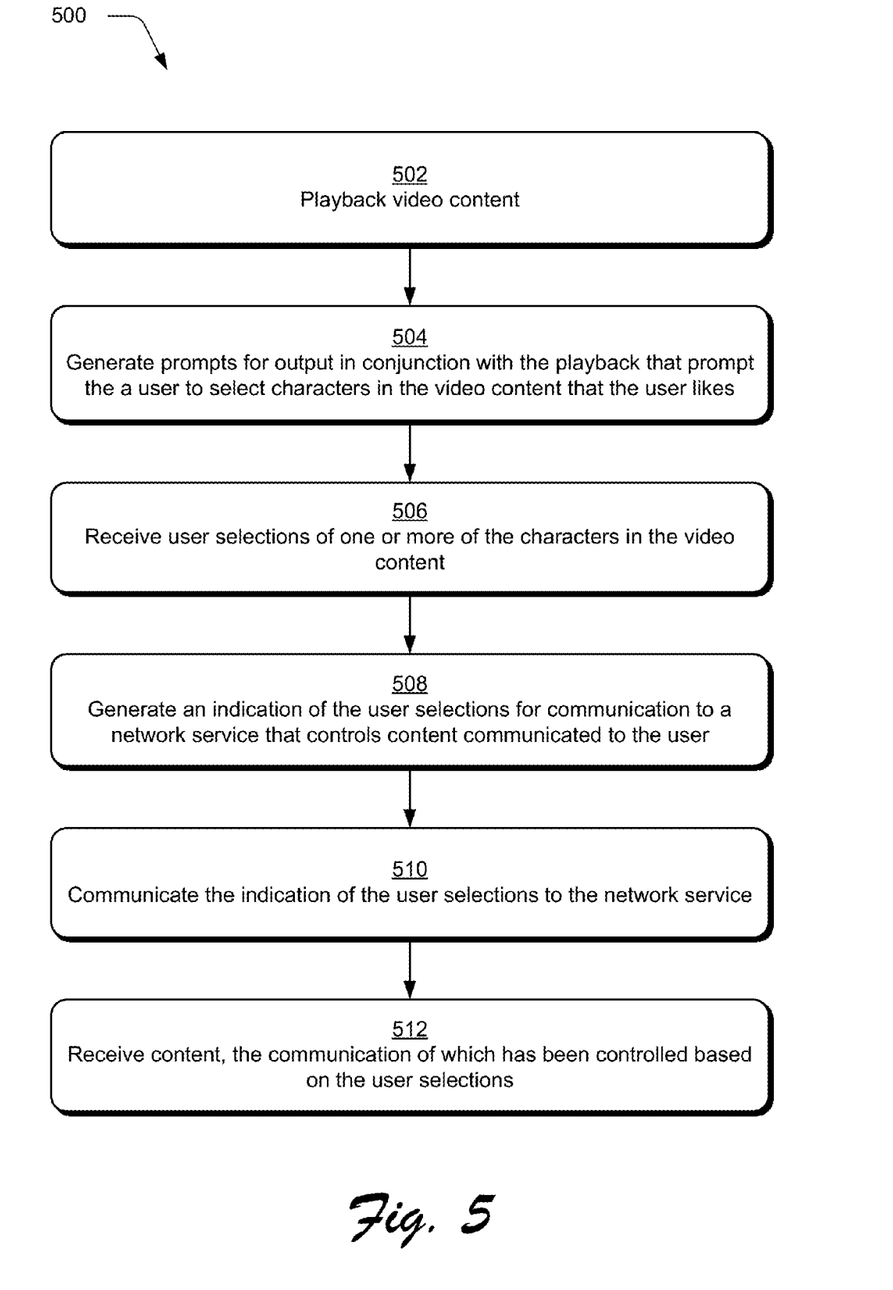
FIG. 5 is a flow diagram depicting a procedure in an example embodiment in which a user makes selections of characters in video content being played back and targeted communications are received based on the character selections.

FIG. 5 depicts an example procedure 500 in which a user makes selections of characters in video content being played back and in which targeted communications are received based on the character selections. Video content is played back (block 502). For example, the client device 204 outputs a television show for playback. In conjunction with playback of the video content, prompts are generated that prompt a user to select characters in the video content that the user likes (block 504). For example, the character selection tool of the media player application 224 generates the prompt 310 of FIG. 3, which prompts a user to select a favorite character from the video being played back.

User selections are received of one or more characters in the video content (block 506). For example, a user of the client device 204 responds to the prompts by selecting one or more characters. In one or more embodiments, the user touches an indication of the characters on a display of the client device 204 to select them. With regard to the example depicted in FIG. 3, the user can touch the selection indication 312 to select Joseph as a favorite character, the selection indication 314 to select Rochelle as a favorite character, and the selection indication 316 to select Monique as a favorite character. Additionally or alternately, the user selects the characters by speaking their names. The user's audible response to the prompts is picked up by microphones of the client device 204 and converted into data representative of a character selection.

An indication of the user selections is generated for communication to a network service that controls communication of content to the user (block 508). For example, the character selection tool of the media player application 224 generates an indication of the character selections received at block 506 for communication to the character selections module 110 of the computing device 102. The indication indicates at least information identifying the user, a character or characters selected, and a video relative to which the characters are selected.

The indication of the user selections is communicated to the network service (block 510). For example, the character selection tool of the media player application 224 causes the indication generated at block 508 to be communicated over a network to the computing device 102 for processing by the character selections module 110.

Content, the communication of which has been controlled based on the user selections of the characters, is received (block 512). As discussed above, the character selections module 110 is configured to process indications, such as the indication communicated at block 510, to determine a degree to which the user associated with the indication identifies with the personality attributes. The character selections module 110 also associates the user with user segments for targeted communications based on a similarity between the user segments and the personality attributes with which the user is determined to identify. Based on the user segments associated with the user, content communicated to the user can be filtered. For example, when content is targeted for communication to a particular user segment a determination is made whether the user is associated with the particular user segment, if so, the content is communicated to the user, and if not, the content is not communicated to the user.

Figure 6:
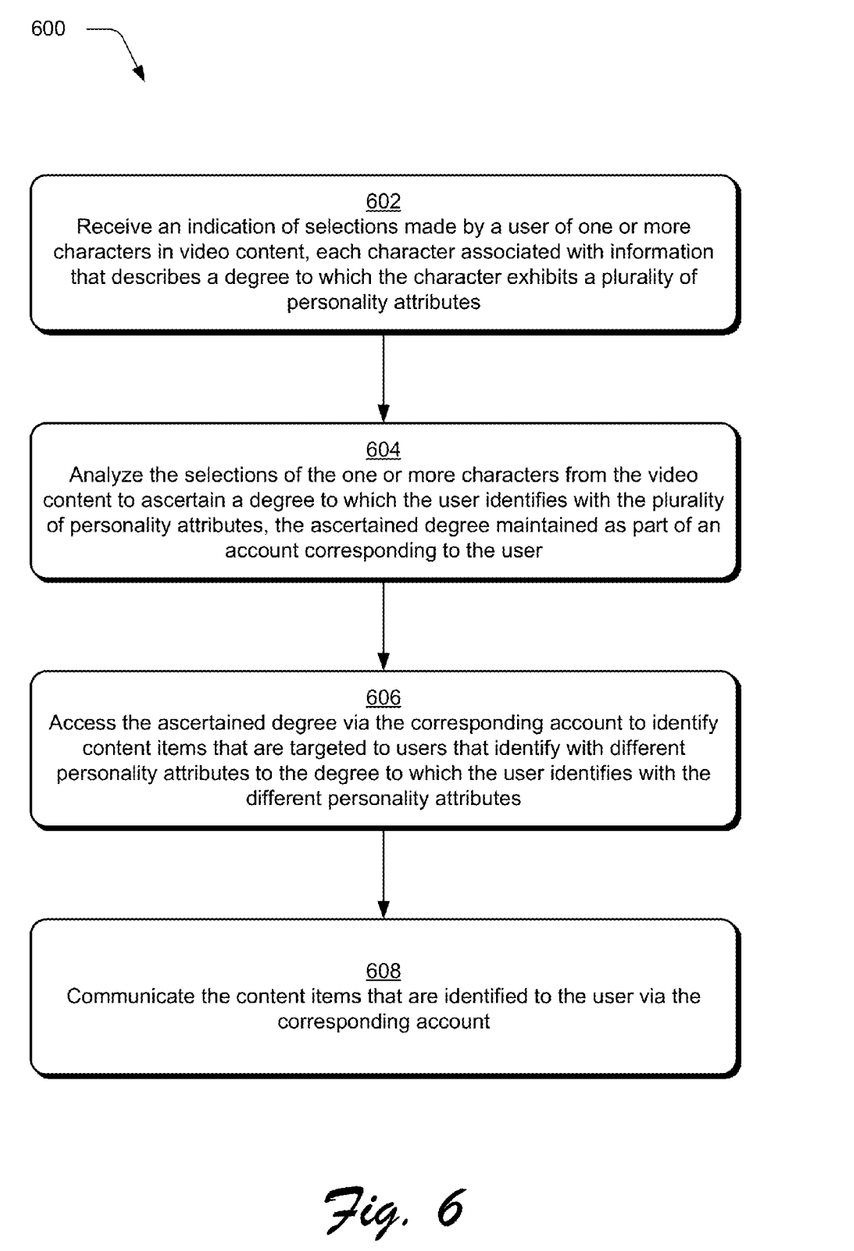
FIG. 6 is a flow diagram depicting a procedure in another example embodiment in which communication of content to a user is controlled based on selections made by the user of characters in video content.

FIG. 6 depicts another example procedure 600 in which communication of content to a user is controlled based on selections made by the user of characters in video content. An indication is received of selections made by a user of one or more characters in video content (block 602). The characters are each associated with information that describes a degree to which the character exhibits a plurality of personality attributes. For example, the character selections module 110 receives character-selection indications from the client device 204, the communication of which is indicated by arrow 226.

The selections of the one or more characters from the video content are analyzed to ascertain a degree to which the user identifies with the plurality of personality attributes (block 604). Further, the ascertained degree is maintained as part of an account corresponding to the user. For example, the character selections module 110 analyzes the character selections of the indication received at block 602. In particular, the character selections module 110 analyzes those character selections to ascertain a degree to which a user of the client device 204 identifies with the plurality of personality attributes. Further, the character selections module 110 causes the ascertained degree to be maintained as part of an account (e.g., an email account, a social networking profile, and so on) corresponding to the user of the client device 204.

The ascertained degree is accessed via the corresponding account to identify content items that are targeted to users that identify with different personality attributes to the degree to which the user identifies with the different personality attributes (block 606). For example, the character selections module 110 accesses the degree ascertained at block 604 via the corresponding account of the user of the client device 204 to identify content items that are targeted to users that identify with different personality attributes to the degree to which the user of the client device 204 identifies with the different personality attributes.

The content items that are identified are communicated to the user via the corresponding account (block 608). For example, the character selections module 110 communicates the content items that are identified at block 606 to the user of the client device 204. In addition or alternately, the marketer 208 or the data management platform 206 cause the content items that are identified at block 606 to be communicated to the user of the client device 204.

Having described example procedures in accordance with one or more embodiments, consider now an example system and device that can be utilized to implement the various techniques described herein.

Example System and Device

Figure 7:
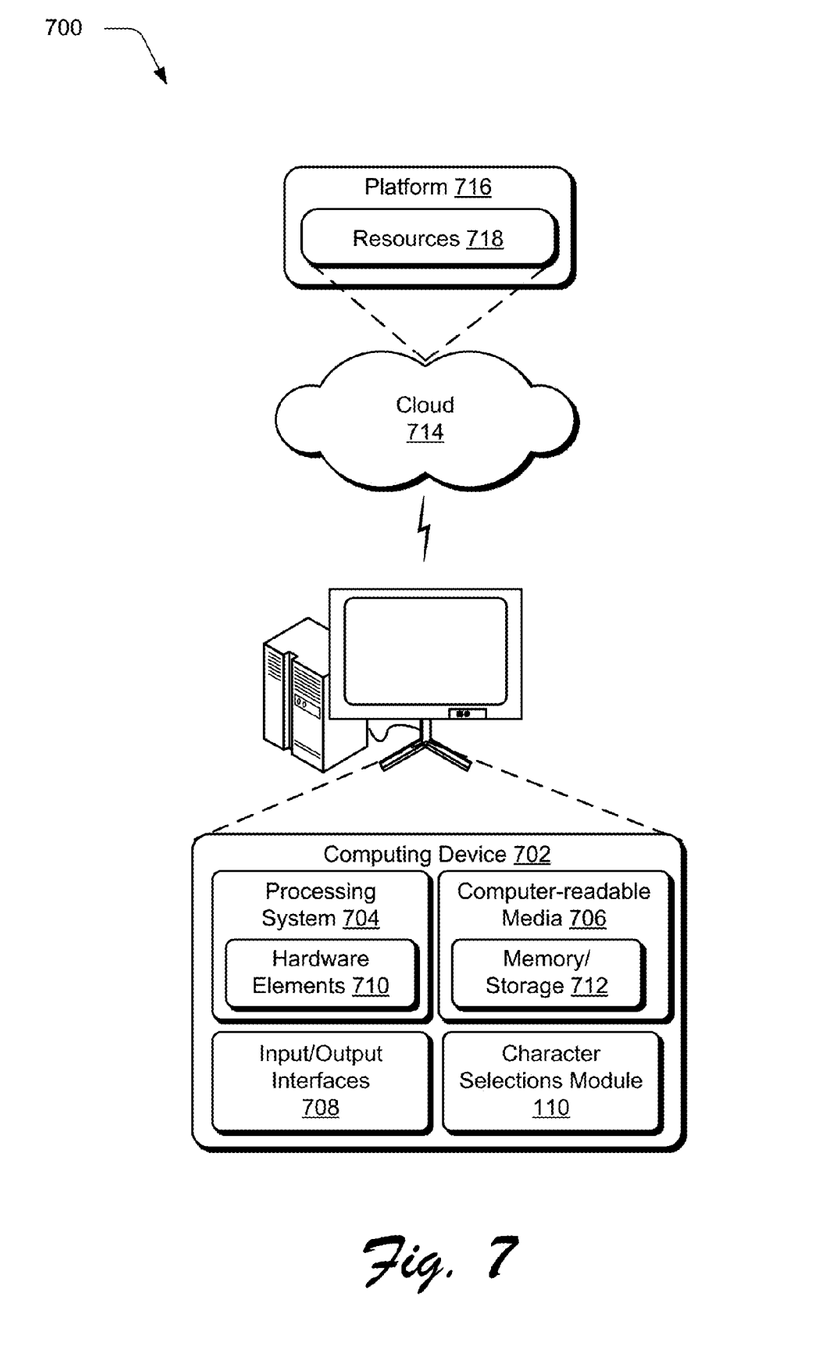
FIG. 7 illustrates an example system including various components of an example device that can be employed for one or more embodiments of techniques for video character-based content targeting that are described herein.

FIG. 7 illustrates an example system generally at 700 that includes an example computing device 702 that is representative of one or more computing systems and/or devices that implement the various techniques described herein. This is illustrated through inclusion of the character selections module 110, which operates as described above. The computing device 702 may be, for example, a server of a service provider, a device associated with a client (e.g., a client device), an on-chip system, and/or any other suitable computing device or computing system.

The example computing device 702 includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 702, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software are achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributed throughout the system 700. For example, the functionality is implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to control content communicated to users based on selections made by the users of characters in video content, the method comprising:
   receiving an indication by the computing device of selections made by a user of one or more of the characters in the video content, each of the characters associated with information that describes a degree to which the characters exhibit a plurality of personality attributes, the degree to which the characters exhibit the plurality of personality attributes being determined on a per-video basis, and at least one of the characters determined to exhibit the plurality of personality attributes to a different degree in different videos;
   ascertaining, by the computing device, a degree to which the user identifies with the plurality of personality attributes by analyzing the selections of the one or more characters from the video content, the ascertained degree maintained as part of an account corresponding to the user;
   identifying, by the computing device, content items that are targeted to users that identify with different said personality attributes to the ascertained degree, in part, by obtaining the ascertained degree from the corresponding account of the user; and
   communicating the identified content items to the user via the corresponding account.

2. A method as described in claim 1, wherein the selections indicate characters in the video content that the user likes.

3. A method as described in claim 1, wherein the indication indicates selections of more than one character and the more than one characters are from different videos.

4. A method as described in claim 1, wherein the video content comprises at least one of a television show or a movie.

5. A method as described in claim 1, wherein the selections of the one or more characters in the video content are made by the user via a user interface in which the video content is presented.

6. A method as described in claim 1, further comprising:
   receiving an indication of different segments into which to group users for communication of the identified content items; and associating the user with one or more of the different segments based on a similarity between keywords describing the different segments and the plurality of personality attributes with which the user identifies.

7. A method as described in claim 6, wherein the different segments correspond to different marketing segments specified by a marketer via a segment management user interface.

8. A method as described in claim 1, further comprising:
receiving metadata that describes the characters in the video content from a content provider; and
determining the degree to which the characters from the video content exhibit the plurality of personality attributes based on an analysis of the metadata.

9. A method as described in claim 1, further comprising prompting the user to select one or more of the characters that the user likes.

10. A method as described in claim 1, further comprising tracking the selections made by the user over multiple video-viewing sessions, and an analysis of the selections made by the user including weighting the selections such that the selections made in conjunction with more recent video-viewing sessions have more weight in determining the degree to which the user identifies with the plurality of personality attributes than the selections made in conjunction with less recent video-viewing sessions.

11. A method as described in claim 1, wherein the identified content items communicated to the user comprise at least one of advertising content or content recommendations.

12. A system to enable control of content communicated to a user based on selections made by the user of characters from video content, the system comprising: a display device configured to display the video content during playback in a user interface;
one or more processors; and
computer-readable storage media having stored thereon instructions that are executable by the one or more processors to implement a character selection tool of a media player application, the character selection tool configured to perform operations comprising:
generating prompts for output in conjunction with the playback that prompt a user to select characters in the video content that the user likes;
receiving user selections of one or more of the characters in the video content, the characters being associated with information that describes a degree to which the characters exhibit a plurality of personality attributes, the degree to which the characters exhibit the plurality of personality attributes being determined on a per-video basis, and at least one of the characters determined to exhibit the plurality of personality traits to a different degree in different videos; and
generating an indication of the user selections for communication to a network service that controls content communicated to the user, the user selections enabling a determination of a degree to which the user identifies with the plurality of personality attributes and the network service configured to control the content communicated to the user according to the degree to which the user identifies with the plurality of personality attributes.

13. A system as described in claim 12, wherein the prompts are output via the user interface displayed on the display device.

14. A system as described in claim 12, wherein the display device is configured with touch functionality and the user selections are received via the user interface using the touch functionality.

15. A system as described in claim 12, further comprising one or more speakers and one or more microphones, the prompts configured to be audibly output via the one or more speakers and the character selection tool configured to receive the user selections from audio input that is received via the one or more microphones.

16. A system as described in claim 12, wherein the character selection tool is configured to generate the prompts, receive the user selections, and generate the indication of the user selections after the user has opted into a feature for controlling content communications based on selections of characters in video content.

17. A method implemented by a computing device to control communication of targeted content to users based on selections made by the users of characters in video content, the method comprising:
obtaining metadata that describes the characters in the video content from a content provider;
defining a plurality of personality attributes that are exhibitable by the characters in the video content based on the metadata;
determining character attribute values for the characters that are indicative of a degree to which the characters in the video content exhibit the plurality of personality attributes based on the metadata, the character attribute values determined on a per-video basis, and at least one of the characters having different determined character attribute values in two or more videos;
receiving selections made by a user of one or more of the characters in the video content, the selections used to determine user attribute values indicative of a degree to which the user identifies with the plurality of personality attributes exhibited by the characters;
receiving an indication of different user segments into which to group users for communication of targeted content;
associating one or more of the different user segments with the user based on a similarity between the different user segments and the plurality of personality attributes with which the user identifies according to the user attribute values; and
controlling the communication of targeted content to the user based on the one or more different user segments associated with the user.

18. A method as described in claim 17, wherein the different user segments correspond to different marketing segments and the targeted content for which the communication is controlled is marketing content.

19. A method as described in claim 17, wherein the targeted content corresponds to at least one of the different user segments and the controlling includes not communicating the targeted content to the user when the user is not associated with the at least one user segment.

20. A method as described in claim 17, wherein the controlling is based on both the determined user attribute values and demographic data of the user.

* * * * *